US009182497B2

(12) United States Patent
Geier et al.

(10) Patent No.: US 9,182,497 B2
(45) Date of Patent: Nov. 10, 2015

(54) GLOBAL POSITIONING SYSTEM (GPS) CARRIER PHASE CYCLE SLIP DETECTION AND CORRECTION

(75) Inventors: George Jeffery Geier, Tucson, AZ (US); David Michael Sneffner, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 665 days.

(21) Appl. No.: 13/415,751

(22) Filed: Mar. 8, 2012

(65) Prior Publication Data

US 2013/0234885 A1  Sep. 12, 2013

(51) Int. Cl.
*G01S 19/29* (2010.01)
*G01S 19/44* (2010.01)
*G01S 19/49* (2010.01)
*G01S 19/40* (2010.01)

(52) U.S. Cl.
CPC ............ *G01S 19/44* (2013.01); *G01S 19/49* (2013.01); *G01S 19/40* (2013.01)

(58) Field of Classification Search
CPC ......... G01S 19/29; G01S 19/26; G01S 19/04; G01S 19/47; G01S 19/55; G01S 19/44; G01S 19/49; G01S 19/40
USPC ............ 342/357.68, 357.65, 357.41, 357.27, 342/357.3, 357.38
See application file for complete search history.

(56) References Cited

U.S. PATENT DOCUMENTS

| | | | |
|---|---|---|---|
| 6,212,476 B1 * | 4/2001 | Noy et al. | 702/9 |
| 6,424,914 B1 * | 7/2002 | Lin | 701/470 |
| 6,697,736 B2 | 2/2004 | Lin | |
| 6,720,913 B1 * | 4/2004 | Schipper | 342/357.26 |
| 6,753,810 B1 | 6/2004 | Yang et al. | |
| 7,205,939 B2 | 4/2007 | Zimmerman | |
| 2007/0237269 A1 * | 10/2007 | Lillo et al. | 375/343 |
| 2010/0033370 A1 * | 2/2010 | Lopez et al. | 342/357.03 |
| 2011/0050492 A1 * | 3/2011 | Um et al. | 342/357.27 |
| 2011/0169689 A1 * | 7/2011 | Wang et al. | 342/357.3 |

OTHER PUBLICATIONS

An Inertial Aided Cycle Slip Detection and Identification Method for Integrated PPP GPS/MEMS IMU; 24$^{th}$ International Technical Meeting of the Satellite Division of The Institute of Navigation; Portland, Oregon; Sep. 19-23, 2011.
Brain et al.; How Stuff Works; How GPS Receivers Work; 1998-2012; http:/www:howstuffworks.com/gadges/travel/gps.htm; 3 pages.

(Continued)

*Primary Examiner* — Harry Liu

(57) ABSTRACT

A method and detector for detecting a global positioning system (GPS) carrier phase (CP) cycle slip or correcting the GPS CP cycle slip is disclosed. A GPS CP cycle slip detector can include an integrated CP (ICP) change measurement module, an ICP change prediction module, and a processor. The ICP change measurement module can be configured for generating a measured ICP change of a measured CP of a GPS signal for a time duration. The ICP change prediction module can be configured for determining a predicted ICP change of the GPS signal CP for the time duration using directional position information. The processor can be configured for detecting in near real time a GPS CP cycle slip when the measured ICP change varies from the predicted ICP change by greater than a threshold value.

17 Claims, 9 Drawing Sheets

(56) References Cited

OTHER PUBLICATIONS

How Stuff Works; Doppler Effect; http://www.howstuffworks.com/dictionary/physics-terms/doppler-effect-info.htm; 1998-2012; 2 pages.
Raytheon, GPS and Navigation Systems; http://www.raytheon.com/capabilities/products/gns/; 2004-2011; 3 pages.
Raytheon; Joint Precision Approach and Landing Systems (JPALS); http://www.raytheon.com/capabilities/products/jpals/; 2002-2011; 2 pages.
Trimble; GPS Tutorial; http://www.trimble.com/gps/sub_phases.shtml; 2012; 2 pages.
Wikipedia; Carrier Recovery; http://wikipedia.org/wiki/Carrier_recovery; page last modified on Aug. 26, 2011; 4 pages.
Wikipedia; Crystal Oven; http://Wikipedia.org/wiki/Crystal_oven; page last modified on Oct. 27, 2011; 5 pages.
Wikipedia; Differential GPS; http://wikipedia.org/wiki/DGPS; page last modified on Jan. 28, 2012; 7 pages.
Wikipedia; Doppler Effect; http://en.wikipedia.org/wiki/Doppler_effect; page last modified on Feb. 5, 2012; 10 pages.
Wikipedia; Doppler Radar; http://en.wikipedia.org/wiki/Doppler_radar; page last modified on Nov. 29, 2011; 4 pages.
Wikipedia; Global Positioning System; http://en.wikipedia.org/wiki/GPS; page last modified on Feb. 2, 2012; 33 pages.
Wikipedia; GPS Signals; http://en.wikipedia.org/wiki/GPS_signals; page last modified on Jan. 11, 2012; 12 pages.
Wikipedia; Joint Precision Approach and Landing System; http://en.wikipedia.org/wiki/Joint_Precision_Approach_and_Landing_System; page last modified on Aug. 28, 2011; 3 pages.
Wikipedia; Kalman Filter; http://en.wikipedia.org/wiki/kalman.filter; page last modified on Feb. 3, 2012; 28 pages.
Wikipedia; Phase-Shift Keying; http://en.wikipedia.org/wiki/Phase-Shift_keying; page last modified on Dec. 22, 2011; 16 pages.
Du ; An Inertial Aided Cycle Slip Detection and Identification Method for Intergrated PPP GPS/MEMS IMU System; $24^{th}$ International Technical Meeting of the Satellite Division of the Institute of Navigation, Portland OR, Sep. 19-23, 2011; pp. 3183-3191.

\* cited by examiner

GLOBAL POSITIONING SYSTEM (GPS) CARRIER PHASE CYCLE SLIP DETECTION AND CORRECTION

BACKGROUND

Satellite navigation systems, such as the global positioning system (GPS), enable a receiver to determine a location from ranging signals received from a plurality of satellites. The ranging signals can be broadcasted on frequencies, such as the $L_1$ signal (1.57542 gigahertz [GHz]) and/or $L_2$ signal (1.2276 GHz). $L_1$ can have a wavelength of about 19 centimeters (cm) and $L_2$ can have a wavelength of about 24 cm. Position can be determined from code (e.g., pseudorandom noise [PRN] code) and/or carrier phase (CP) information. A PRN code is transmitted by the GPS satellites to the receiver and correlated with replica codes to determine ranges to different satellites. Accuracy can be enhanced using real-time kinematic (RTK) processing of carrier phase information. Accuracy at the level of tens of centimeters is possible with RTK carrier phase integer ambiguity resolution. RTK carrier phase integer ambiguity resolution can be used in applications with very accurate positional location information requirements and high integrity requirements.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
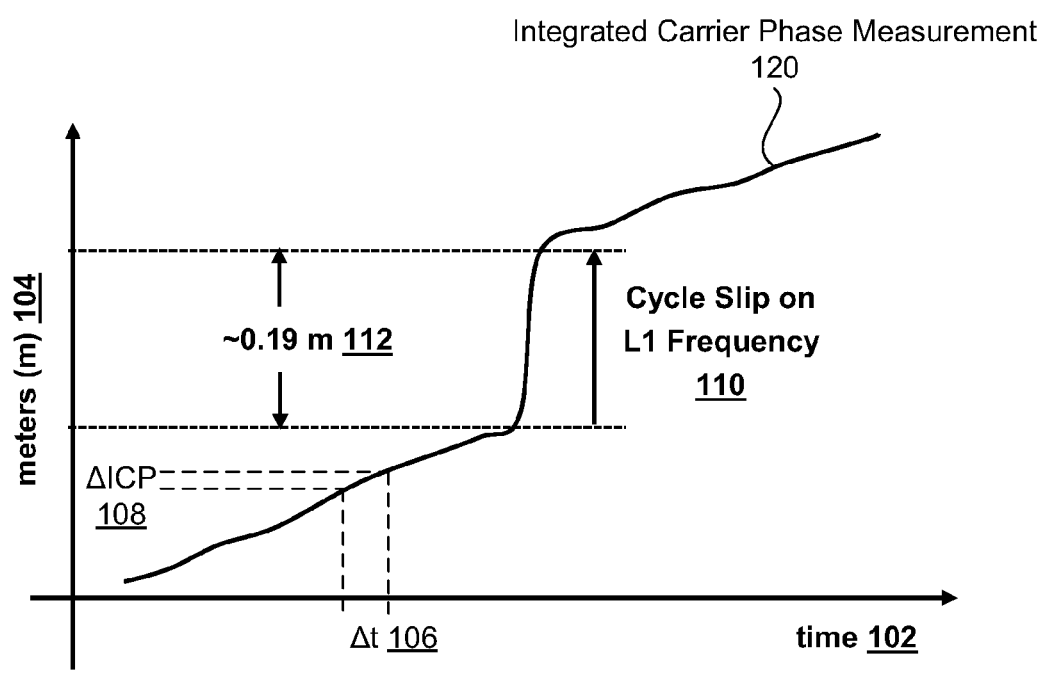
FIG. 1 illustrates a diagram of a global positioning system (GPS) carrier phase (CP) cycle slip in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly, but is not intended to necessarily identify key features or essential features of the technology; nor is it intended to limit the scope of the claimed subject matter. However, the initial summary should not be considered limiting, and may contribute to the enabling disclosure of the present invention and support of the appended claims.

Global positioning system (GPS) carrier phase (CP) cycle slips can cause disruptions in the CP information used by a GPS receiver for precise relative position determination. Cycle slips can occur with unacceptably high frequency (e.g., several in a period as short as 100 seconds, even while a GPS receiver is stationary). A method and apparatus can be used for detecting and correcting errors induced by momentary loss of phase track in a GPS receiver. The GPS receiver can use a near real time cycle slip detector to detect cycle slips and/or correct a measured integrated CP (ICP) change of a GPS signal with a predicted ICP change of the GPS signal.

In one embodiment, a GPS receiver may be located on a vehicle. The vehicle may be a ground based vehicle, an air based vehicle, or a water based vehicle. The prediction of the ICP change can be based on predicting or accounting for vehicle dynamics of the vehicle with the GPS receiver, clock dynamics, and GPS satellite dynamics. A GPS calibrated directional sensor (e.g., a inertial measurement unit [IMU] or other type of directional sensor or group of directional sensors) can be used in the prediction of a phase change induced by vehicle dynamics. Since a GPS antenna and directional sensor may not be in the same location, a lever arm from the directional sensor to a GPS antenna can be used to capture the effects of the vehicle under rotation.

Clock dynamics of the prediction of the ICP change can be removed through single differences or estimated clock phase error difference (e.g., by using a Kalman filter). GPS satellite dynamics can be estimated using ephemeris of the GPS satellite.

The cycle slip detector can compare the measured ICP change of the GPS signal with the analytical prediction of the ICP change based upon information external to the GPS tracking loop, such as information provided by the directional sensor that can be used to calculate a predicted ICP change. The cycle slip detector can correct for a cycle slip when the measured ICP change varies from the prediction of the ICP change by more than a threshold value by substituting the measured ICP change with the analytical prediction of the ICP change.

Uncorrected CP cycle slips can impair precise GPS positioning. For example, using a single frequency carrier (e.g., $L_1$ or $L_2$), a single CP cycle slip may generate a positional shift or "jump" of approximately 20 centimeters (cm), Typically, information external to the carrier tracking loops are not supplied to aid in the CP cycle slip detection process, and CP cycle slip detection is not performed in real time or near real time in a typical GPS receiver, so typical (or post processing) CP cycle slip detection cannot be used to correct the CP. For applications that may use a high level of accuracy, such as an accuracy of approximately 10-20 cm, CP cycle slips can impair accuracy. Cycle slips may be minimized through oscillator selection. However, cycle slips can occur even for high performance, expensive oscillators. Accordingly, CP cycle slip detection and correction can be used to significantly reduce the chances of CP cycle slips causing undesired changes in GPS positioning. Accurate positioning can be valuable in a wide variety of fields, including air travel, farming, and mining to name a few.

While examples are provided herein using particular frequencies, such as the GPS $L_1$ and $L_2$ frequencies, this is not considered limiting. Any frequency may be used to communicate location information from the GPS satellites to a GPS receiver.

Examples are also provided of pseudo range detection based on the use of PRN codes. While this is one way of identifying a distance between a satellite and a GPS receiver, other mechanisms may also be used. The embodiments described herein can be used with any measurement system in which a carrier phase of a GPS signal can be measured.

The following provides additional details of examples for CP cycle slip detection and correction. Precise relative positioning can achieve centimeter-level (cm-level) accuracies using global positioning system (GPS) real time kinematic (RTK) positioning. RTK positioning can replace conventional GPS pseudo range (PR) constructed from code tracking with ranges constructed from carrier phase (CP) tracking. In a code tracking example, a GPS receiver compares a pseudo-random noise (PRN) signal received from the GPS satellite with an internally generated copy of the same PRN signal. Due to the delay or time-of-flight (TOF) of the PRN signal of the GPS satellite traveling to the GPS receiver, a copy of the GPS satellite's PRN signal in the GPS receiver is delayed in relation to an internally generated local copy of the PRN signal. The time delay can be calculated by aligning the two signals. The time delay represents the TOF for the signal to reach the GPS receiver from the GPS satellite. Using the time delay, the distance from the satellite can be calculated. By identifying the location of multiple GPS satellites relative to the GPS receiver, the location of the GPS receiver can be determined.

The accuracy of the resulting pseudo range (PR) measurement of the PRN code using code tracking is generally a function of the ability of the GPS receiver's electronics to accurately compare the PRN received signal with the internally generated copy of the PRN signal. GPS receivers can align the received and generated PRN signals within a tolerance or margin of error of a bit-width (or chip-width). For example, the commercial or coarse-acquisition (C/A) code sent by the GPS satellites can send a bit every 0.98 microsecond (µs), so a GPS receiver with a 1% margin of error can be accurate to 0.01 µs, which can translate to about 3 meters (m) in terms of distance, without considering other effects and errors.

The military-only P(Y) code sent by the GPS satellites can be clocked ten times faster than the C/A code, so with code tracking the GPS receiver can be accurate down to about 30 cm, without considering other effects and errors. Other effects on the signal can introduce errors on the accuracy of the C/A code, so accuracy based on an uncorrected C/A signal can be generally about 15 m when the other effects are considered. The P(Y) code can be similarly affected. A plurality of GPS signals, such as $L_1$, $L_2$, and/or $L_5$, can be used to reduce the errors and other effects and improve accuracy over using a single GPS signal. Mechanisms may be used to correct for errors common to the plurality of GPS signals, referred to as common mode error.

In a CP tracking example, the GPS receiver tracks the GPS satellite's carrier (or phase) as the signal, instead of the messages contained within the signal or PRN code. CP tracking (or carrier tracking) can provide greater accuracy and resolution of the signal over code tracking, since the signal can be subdivided into multiple segments based on the signal's phase. For instance, the GPS coarse-acquisition (C/A) code broadcast in the $L_1$ signal changes phase at a frequency at approximately 1.023 MHz, but the $L_1$ carrier can change phase at a frequency at 1575.42 MHz, which can correspond to a wavelength of 19 cm for the $L_1$ signal.

Each wavelength of a received carrier signal is comprised of a 360 degree change in the phase of a sinusoidal signal of the carrier signal. This signal may be further subdivided into segments based on the change in phase, such as three 120 degree segments, four 90 degree segments, six 60 degree segments, and so forth. The actual accuracy may depend on the accuracy of a phase lock loop to track the carrier's phase. This enables the accuracy to be improved by approximately the number of phase segments. For instance, if four 90 degree phase segments are tracked for the $L_1$ carrier, each segment can represent $\frac{1}{4}^{th}$ of the wavelength, or approximately 5 cm. However, when a cycle slip occurs, an entire wavelength can pass, thereby resulting in a 19 cm error. Thus, cycle slips can cause relatively large errors to occur in systems designed for CP tracking.

The received and generated PRN signals are deliberately encoded in order to allow them to be easily aligned, whereas every cycle of the carrier using in CP tracking is similar to every other, so the CP signals may be subject to misalignment. A misalignment of CP signals in CP tracking can introduce errors adversely affecting the precision of the GPS receiver. For example, if the alignment of a CP of an $L_1$ signal is off by one cycle, an error of 19 cm (or a larger multiple of 19 cm) can be introduced. A misalignment problem or integer ambiguity problem can be addressed or corrected to some degree with sophisticated statistical methods that compare the measurements from the C/A signals and by comparing the resulting ranges between multiple satellites.

CP cycle slips can be a source of misalignment not resolved by integer ambiguity statistical methods and can cause disruptions in the carrier phase information required for precise relative position determination. CP cycle slips cause a jump on the integer ambiguities and deteriorate the obtainable accuracy if the cycle slips remain undetected.

In another example, precise positioning based upon CP may use a continuous CP reference maintained by tracking the phase of each GPS carrier frequency (i.e., the $L_1$ and $L_2$ frequencies). A momentary loss of a CP track on either frequency can induce loss of the full attainable accuracy based upon CP. Cycle slip detection within a carrier phase tracking loop may be unreliable. For example, in some applications, a CP cycle slip with missed detections may occur frequently, such as greater than 4 times within 100 secs. The momentary loss of phase tracking may occur at any time, such as landing or alignment of a host vehicle relative to a remote vehicle.

A cycle slip can negatively impact the solution accuracy of a GPS receiver in a way which cannot be predicted when the slip is not at least detected. The GPS CP cycle slip detector and method for GPS CP cycle slip detection can exploit the full redundancy of carrier phase tracking information within the receiver and analytical predictions external to the receiver's tracking loops, such as GPS ephemeris information and directional sensor information. Independent $L_1$-only and $L_2$-only CP references, plus a third, analytically derived pseudo CP reference determined from the directional sensor information and the GPS satellite position and velocity information derived from the GPS ephemeris data may provide redundant pieces of information. Since directional sensor and ephemeris based predictions of integrated carrier phase can develop errors very slowly over time, the prediction can be suitable for detecting and correcting abrupt errors induced by cycle slips over a short time duration, such as each second, but can be extended over several seconds to cover momentary loss of phase track situations. The analytical predictions can be jump free and can be used to detect cycle slips reliably in either tracking frequency. Common mode errors related to oscillator behavior can produce cycle slips strongly correlated across $L_1$ and $L_2$ tracking (i.e., occurring on both $L_1$ and $L_2$), so a comparison between $L_1$ and $L_2$ tracking may not detect common mode errors. In some examples, common mode errors can account for approximately half of the cycle slips. Examples of common mode errors can include ionospheric errors, tropospheric errors, GPS position errors, and satellite clock error. Examples of non-common mode errors can include residual noise of the GPS receiver and multipath error (e.g., reflection error). A CP measurement from the first carrier frequency (e.g., $L_1$), a CP measurement from the second carrier frequency (e.g., $L_2$), and a CP prediction can permit a "voting" operation (or selection process) to isolate faults, including cycle slips, in either the $L_1$ or $L_2$ carrier phases. The voting process can be repeated periodically, such as each second within the GPS receiver. The use of directional sensor information and/or GPS satellite ephemeris information can be used predict the ICP and establish redundancy to permit cycle slip detection and/or correction.

FIG. 1 illustrates an example of a GPS CP cycle slip 110 on a $L_1$ frequency or carrier in an integrated CP (ICP) measurement 120 resulting in a 19 cm measurement error 112. Other GPS signals, such as $L_2$, can have a different measurement error. The CP can be converted to represent a distance in meters (m) 104 over time 102. An ICP change ΔICP 108 can be measured for a specified time period (or change of time) Δt 106. Cycle slips can be caused by a variety of sources. Oscillator errors, high or excessive dynamics, signal obstruction, and low satellite elevation (e.g., small elevation angle relative to the receiver) may cause the cycle slips. Excess dynamics (e.g., launch shock) can induce loss of a phase lock used in carrier tracking through oscillator gravitation force sensitivity (g-sensitivity). Oscillator instability can induce cycle slips, even in a static receiver (e.g., a receiver not in motion). The bandwidth of tracking loops in a phase lock loop tracking device and the quality and precision of the oscillator can also affect the number of cycle slips in a duration of time.

A higher quality oscillator such as oven-controlled crystal oscillator (OCXO, where "XO" is an old acronym for "crystal oscillator") can have lower tracking loop bandwidths and/or fewer cycle slips than a lower precision temperature compensated crystal oscillator (TCXO). A crystal oven is a temperature-controlled chamber used to maintain the quartz crystal in electronic crystal oscillators at a constant temperature, in order to prevent changes in the frequency due to variations in ambient temperature. The OCXO can achieve high frequency stability with a crystal, but can have longer warm up times (e.g., 2 minutes). The TCXO can be stable within a few seconds, smaller in size, and cheaper than an OCXO, but can experience more cycle slips or hiccups.

Figure 2:
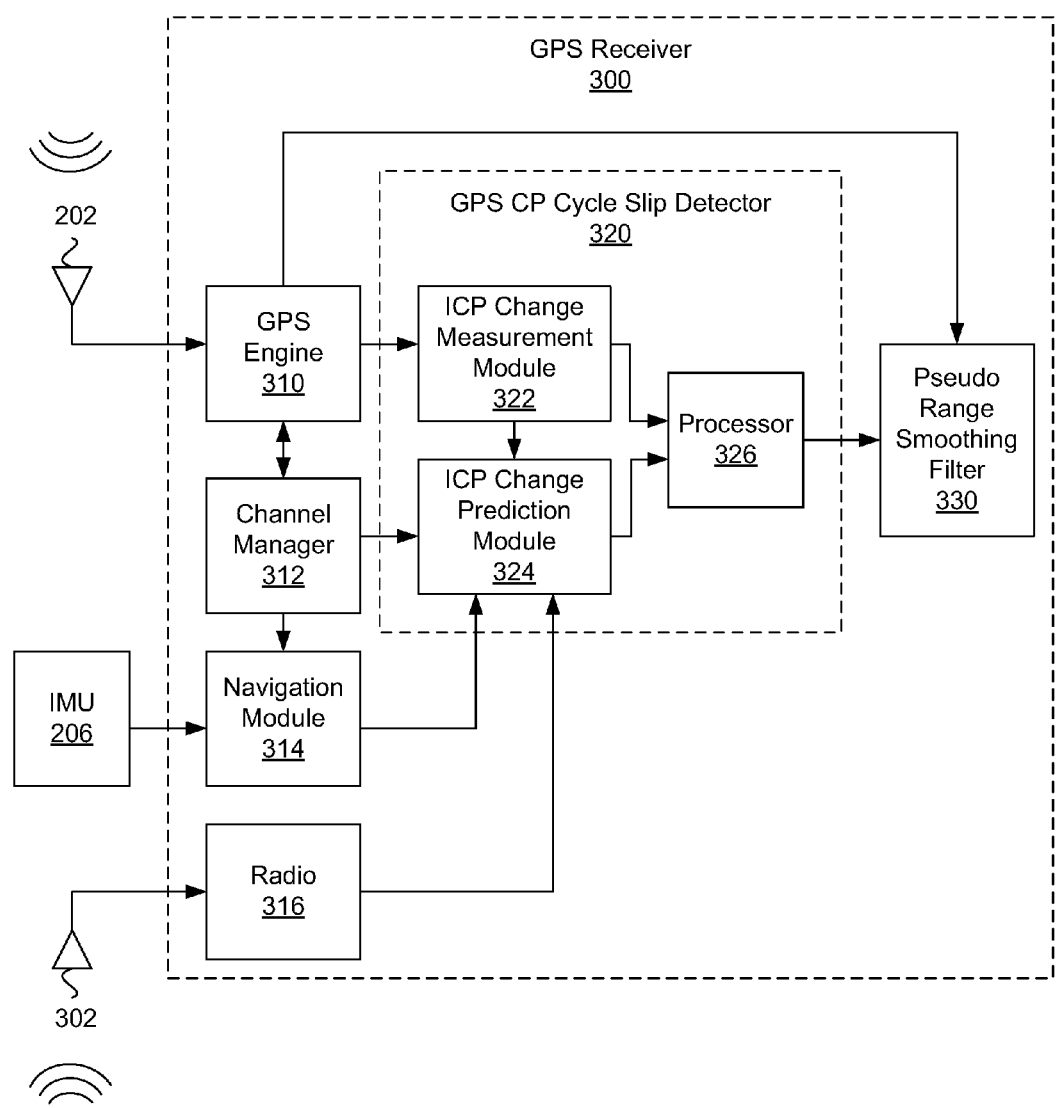
FIG. 2 illustrates a block diagram of a global positioning system (GPS) receiver with a GPS carrier phase (CP) cycle slip detector and a navigation module in accordance with an example of the present invention.

FIG. 2 illustrates an example of a GPS CP cycle slip detector 320 in a GPS receiver 300. The GPS CP cycle slip detector and the method for detecting a GPS CP cycle slip can be used in a commercial coarse-acquisition (C/A) code GPS receiver, a military P(Y) code receiver, or an M code receiver using a varied GPS signal structure. A radio frequency GPS signal (e.g., $L_1$ or $L_2$) may be received by a GPS engine 310 via GPS antenna 202. The GPS engine can generate a pseudo range (PR) measurement using the PRN code and an integrated CP (ICP) measurement using the CP of the GPS signal.

A GPS satellite's position and PR measurement can define a sphere, centered on the GPS satellite, with radius equal to the PR measurement. The CP can be the carrier phase in the segment of the current cycle of the GPS signal (i.e., wavelength), measured as a fraction of a full wavelength (i.e., in radians or degrees). The ICP can be the total integrated number of carrier cycles since a carrier tracking loop has established phase lock, measured in an integer number of carrier cycles plus a fraction. The ICP change can be the difference between the ICP at a first time and the ICP at a second time. The ICP may not be calculated in a standard GPS receiver, but the ICP measurement and prediction may be used to support a precise carrier phase solution. The ICP measurement differences may also be used to filter noise and multipath in the PR measurements. The ICP measurement or prediction can include the total change in carrier phase which can be used to calculate a total change in host vehicle motion (e.g., GPS receiver motion), GPS satellite motion, and an effective movement of a GPS receiver and GPS satellite clocks, in the absence of cycle slips. For example, in a host vehicle travelling 100 meters/second (m/sec) in the direction of a GPS satellite, the ICP can increment on a GPS signal carrier by the velocity/wavelength of the GPS signal carrier (e.g., 100/0.1903 meters (the $L_1$ wavelength) every second).

PR measurements ($PR_\square$ and ICP measurements (ICP) may be generated from at least two signals combined together to form a wide lane measurement or a narrow lane measurement. For example, a narrow lane combination of PR measurements using $L_1$ and $L_2$ can be represented by $PR_{NL} = (PR_{L1} + PR_{L2})/2$.

A CP measurement ($\square_f$ where f is the phase combination used) used in the ICP can use multiple GPS signals or a single GPS signal. For example, a wide lane combination of CP measurements using $L_1$ and $L_2$ can be represented by $\square_{WL} = \square_{L1} - \square_{L2}$ with $\square_{WL}$~86.19 cm, a narrow lane combination of CP measurements using $L_1$ and $L_2$ can be represented by $\square_{NL} = \square_{L1} + \square_{L2}$ with $\square_{NL}$~10.70 cm, and a single frequency CP measurement using $L_1$ or $L_2$ can be represented by $\square_{L1}$ with $\square_{L1}$~19.03 cm or $\square_{L2}$ with $\square$~24.42 cm, respectively. The CP (or CP measurements) can include a $L_1$ CP, a $L_2$ CP, a wide lane CP, a narrow lane CP, or combinations of these CPs.

The GPS engine 310 can generate a PR measurement and an ICP measurement for the GPS CP cycle slip detector 320. In an example, the PR measurement can be a narrow lane PR measurement, and the ICP measurement can be a wide lane ICP measurement. The GPS CP cycle slip detector can include an ICP change measurement module 322, an ICP change prediction module 324, and a processor 326.

The integrated CP (ICP) change measurement module 322 can generate a measured ICP change of a measured CP of a GPS signal for a time duration, such as one second. In another example, where a momentary loss of a GPS CP track occurs, the time duration can be set for longer, such as less than five seconds.

The ICP change prediction module 324 can determine a predicted ICP change of the GPS signal CP for the time duration using directional position information. The directional position information can be provided by a navigation module 314 (discussed in greater detail below). The processor 326 can identify, in near real time, a GPS CP cycle slip when the measured ICP change, output by the ICP change measurement module 322, varies from the predicted ICP change, output by the ICP change prediction module, by greater than a threshold value.

Near real time can refer to time within a sampling cycle of directional sensor information or GPS signal information, such as a sampling cycle of 50 Hertz (Hz) (i.e. less than 20 ms). In an example, the threshold value can be set to one-half wavelength of the CP, a multiple of a half wavelength of the CP, or a fraction of the CP wavelength greater than a quarter of the CP wavelength. The threshold value can be used to determine the sensitivity of detecting cycle slips or other CP errors. The processor can correct in near real time the GPS CP cycle slip by replacing the measured ICP change for a CP cycle with the predicted ICP change when the measured ICP change varies from the predicted ICP change by greater than the threshold value.

Figure 5:
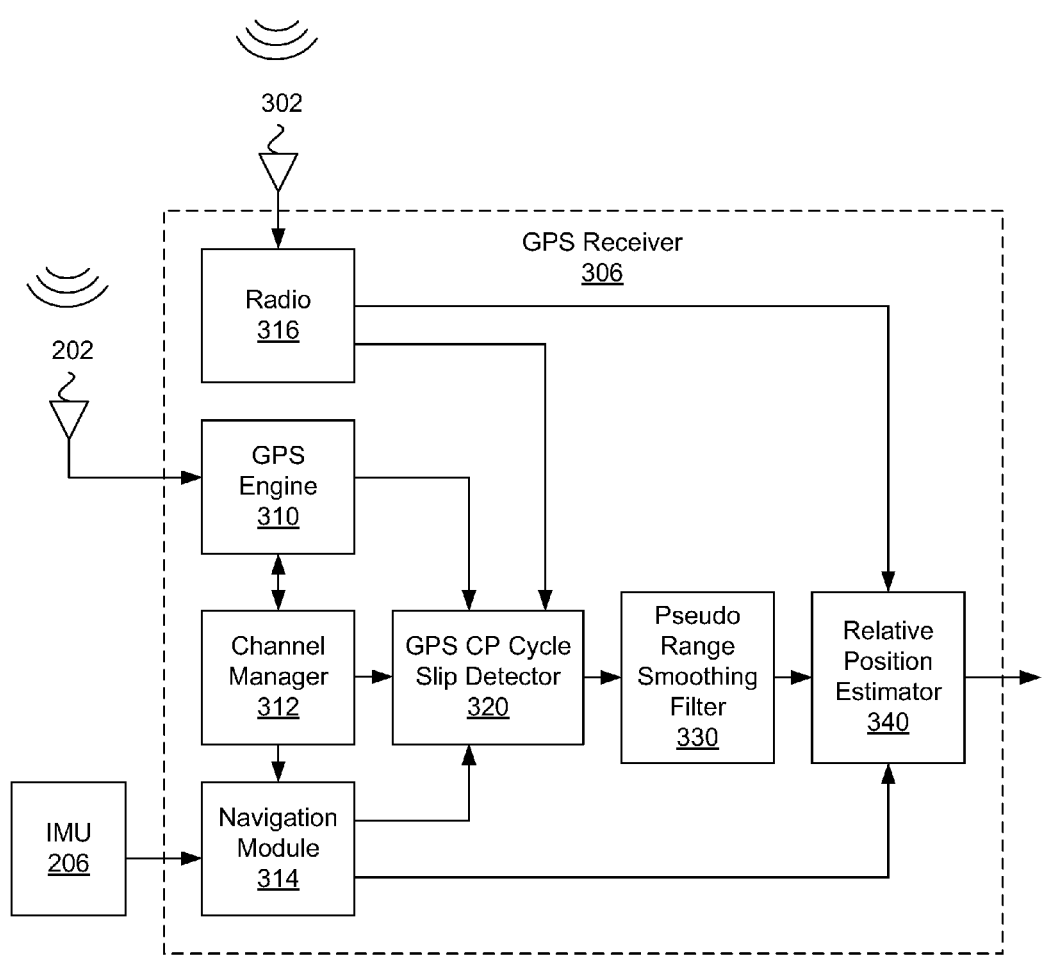
FIG. 5 illustrates a block diagram of a global positioning system (GPS) receiver with a GPS carrier phase (CP) cycle slip detector and a relative position module in accordance with an example of the present invention.

The GPS receiver may also include a channel manager 312, a navigation module 314, a radio 316, a PR smoothing filter 330, and a relative position estimator 340 (FIG. 5). The channel manager can generate GPS satellite information, including GPS satellite ephemeris information, and provide telemetry processing. The navigation module can be coupled to a directional sensor. The navigation module may generate a change in position of the host vehicle of the GPS receiver using directional sensor information. The change in position detected by the directional sensor may be calibrated by past GPS PR and delta range [DR] measurements.

The directional sensor can include an inertial measurement unit (IMU) 206, an inertial navigation system (INS), a motion sensor, an accelerometer, a magnetometer, a barometer, a rotation sensor, a gyroscope, or a combination of these sensors. The radio can be coupled to an antenna for transceiving messages with a remote radio on a remote vehicle or a known ground location. The radio can receive remote vehicle position and/or velocity information, such a filtered ICP and a filtered PR, from a remote GPS receiver (e.g., a second GPS receiver). The filtered ICP and the filtered PR from the remote GPS receiver can be differenced (e.g., single differenced or double differenced) with a filtered ICP and a filtered PR from the GPS receiver 300 to correct for clock errors or to determine a relative position between the remote receiver of a remote vehicle and the GPS receiver of the host vehicle. The radio can compensate for transmission delay of the remote vehicle position and/or velocity information from a remote GPS receiver relative to the position and/or velocity information from the host GPS receiver.

In an example, the GPS CP cycle slip detector 320 can generate the PR measurement and an ICP change from the PR measurement and the ICP measurement of the GPS engine 310, a clock estimate from the radio 316, and a clock estimate from the navigation module 314. A PR smoothing filter may generate a filtered PR using an output of the GPS CP cycle slip detector. In an example, the output of the GPS CP cycle slip detector can include a narrow lane PR and/or an ICP change. The relative position estimator 340 (FIG. 5) can generate a three dimensional (3D) relative position vector (r) using the filtered PR output by the smoothing filter 330, a host vehicle velocity from the navigation module, and a remote vehicle velocity (e.g., a remote GPS receiver velocity) from the radio.

Each carrier smoothing filter or PR smoothing filter can include a filter for handling noise and other inaccuracies, such as a Kalman filter. The relative position estimator and/or navigation module may also include a filter for handling noise and other inaccuracies, such as a Kalman filter.

With measurements observed over time containing noise, random variations, and other inaccuracies, the Kalman filter can generate values that tend to be closer to the true values of the measurements and their associated calculated values. The Kalman filter can produce estimates of the true values of measurements and their associated calculated values by predicting a value, estimating the uncertainty of the predicted value, and computing a weighted average of the predicted value and the measured value. The most weight can be given to the value with the least uncertainty. The estimates produced by the method used by the Kalman filter tend to be closer to the true values than the original measurements because the weighted average has a better estimated uncertainty than either of the values that went into the weighted average.

Figure 3:
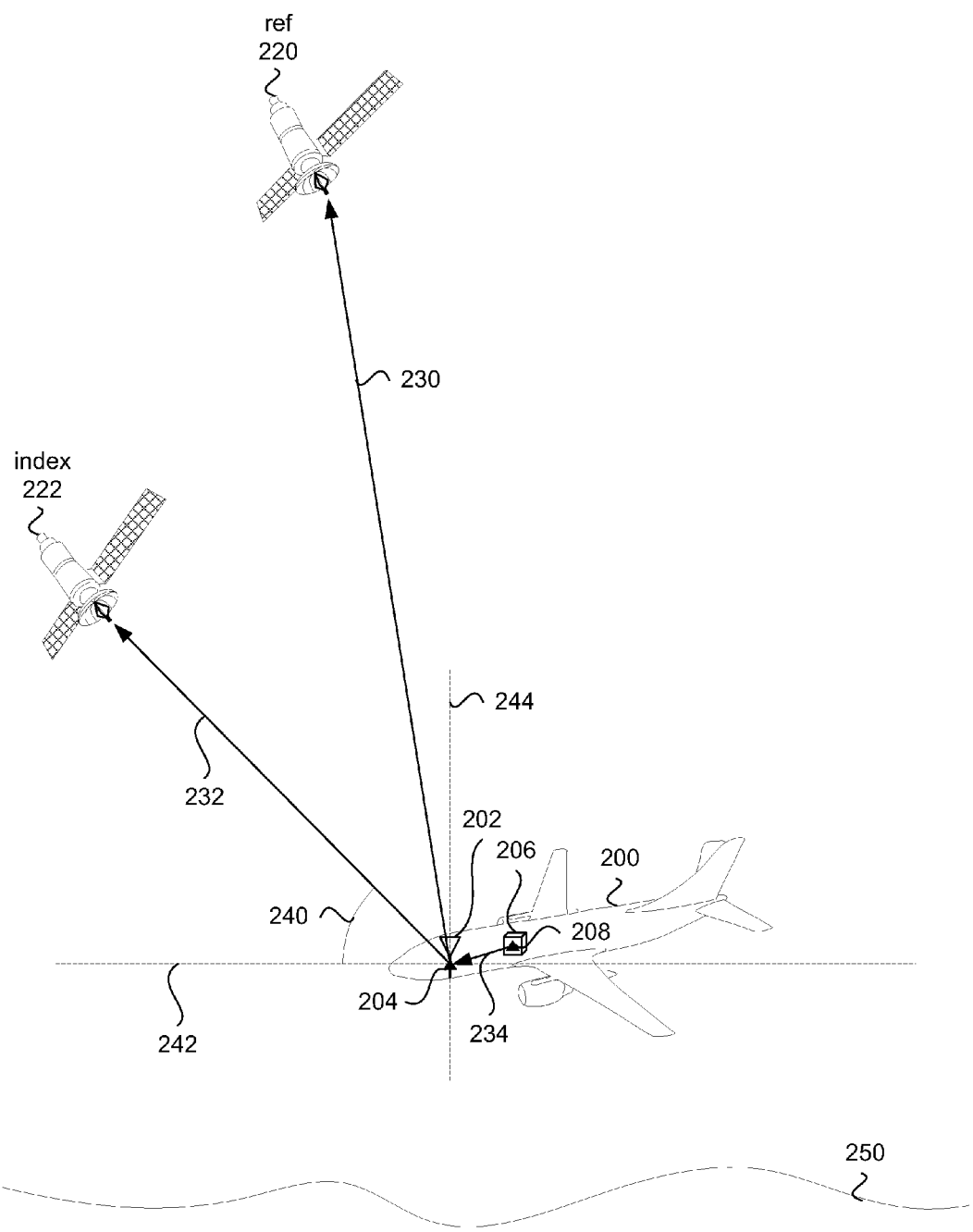
FIG. 3 illustrates a diagram of a plurality of global positioning system (GPS) satellites and a GPS antenna and an inertial measurement unit (IMU) sensor rigidly fixed on a host vehicle in accordance with an example of the present invention.

The ICP change prediction module 324 can use directional sensor information including the change in position of the host vehicle generated by the directional sensor and GPS satellite ephemeris information. FIG. 3 illustrates an example of a host vehicle 200 with a GPS antenna 202 and a directional sensor 206. The host vehicle is shown as an airplane above the ground 250.

Examples of vehicles (e.g., host vehicles or remote vehicles) can include land vehicles (e.g., a car, a tank, or unmanned ground vehicle [UGV]), water vehicle (e.g., a ship, a submarine, or an unmanned surface vehicle [USV]), an airborne vehicle (e.g., a jet, a missile, or an unmanned aerial vehicle [UAV]), or a space vehicle (SV), such as a satellite, a space shuttle, or a manned or un unmanned spacecraft.

The ICP change prediction module 324 can determine a change in position projected along a GPS satellite line-of-sight (LOS) 230, 232 from a phase center of a GPS antenna over the time duration, account for a clock phase error change over the time duration, and/or integrate a velocity of the GPS satellite 220, 222 projected along the GPS satellite LOS over the time duration. The ICP change prediction module can sum contributions from the change in position, the clock phase error change, if any, and the integration of the velocity of the GPS satellite to generate the predicted ICP change.

In an example, the predicted ICP change $\Delta ICP_i$ generated by the ICP change prediction module using the directional sensor information can be represented by Equation 1, shown below, where $\Delta ICP_i$ is the predicted integrated carrier phase change for a GPS satellite with index i, $u_i^T$ is a transpose of a unit line-of-sight (LOS) vector from the GPS receiver to the GPS satellite, $\Delta p_{IMU}$ is a change in a position vector of the directional sensor, such as an inertial measurement unit (IMU), ω is an angular velocity vector of the GPS receiver, l is a lever arm vector between the IMU and a phase center for a GPS antenna for the GPS receiver, $\Delta\delta\phi$ is a clock phase error change over the time duration, and $v_i$ is a velocity vector of the GPS satellite.

$$\Delta ICP_i = u_i^T(\Delta p_{IMU} + \omega \times 1) + \Delta\delta\phi + \int(u_i^T v_i) dt \qquad \text{[Equation 1]}$$

In an example, the vehicle dynamics of the vehicle with the GPS receiver can be represented by the term $u_i^T(\Delta p_{IMU} + \omega \times 1)$, clock dynamics can be represented by the term $\Delta\delta\phi$, and space vehicle (SV) dynamics or GPS satellite dynamics can be represented by the term $\int(u_i^T v_1) dt$, shown in Equation 1.

Referring back to FIG. 3, the GPS antenna can receive GPS signals from GPS satellites 222 and 220. A reference GPS satellite 220 may have a higher elevation than remaining GPS satellites in communication with a GPS receiver, where the remaining GPS satellites may be referred to as index GPS satellites 222.

The predicted ICP change $\Delta ICP_i$ representation can apply to reference and index satellites. The distinction between a reference GPS satellite and an index GPS satellite can be useful when determining a predicted ICP change single difference $\Delta ICP_{ir}$ between a predicted ICP change $\Delta ICP_i$ for an index GPS satellite and a predicted ICP change $\Delta ICP_r$ for a reference GPS satellite, where reference r is substituted for index i in Equation 1.

The differences, such as single differences, can be useful in accounting for the clock phase error change over the time duration, by cancelling the clock phase error change. Difference measurements can be calculation between measurements from two receivers or two GPS satellites. For example, a single difference can represent a subtraction of a distance measurement from a first GPS satellite (e.g., the reference satellite) from a distance measurement from a second GPS satellite (e.g., the index satellite) at the same GPS receiver. A double difference can represent a subtraction of a single difference measurement from a first GPS receiver (e.g., the local GPS receiver) from a single difference measurement from a second GPS receiver (e.g., the remote GPS receiver) using the same first and second GPS satellites represented in the single differences. Alternatively, a single difference can represent a subtraction of a distance measurement of a reference GPS satellite (or an index GPS satellite) to a first GPS receiver (e.g., the local GPS receiver) from a distance measurement of the reference GPS satellite (or the index GPS satellite) to a second GPS receiver (e.g., the remote GPS receiver). Double differences can then be calculated using the single differences between two GPS satellites. The clock phase error change may be essentially removed from Equation 1 by subtracting the predicted $\Delta ICP$ for the reference GPS satellite (i.e., doing the prediction for the single difference).

Each GPS satellite can have a unit line-of-sight (LOS) vector from the GPS receiver to the GPS satellite. For example, a LOS vector 232 for an index GPS satellite and a LOS vector 230 for a reference GPS satellite may be generated using PR information. A unit LOS vector for the index GPS satellite can be calculated from the LOS vector for the index GPS satellite, and a unit LOS vector for the reference GPS satellite can be calculated from the LOS vector for the reference GPS satellite. The unit vector in a normed vector space is a vector (often a spatial vector) whose length is equal to one (the unit length).

The GPS antenna can have a phase center 204, which can be used as the center for a GPS antenna for positioning calculations. The directional sensor 206, such as an inertial measurement unit (IMU), can have a directional sensor center 208, such as an IMU center, which can be used as the center for the directional sensor (e.g., IMU) for positioning calculations. The GPS antenna phase center and directional sensor center can be measured and/or provided in the specifications for the GPS antenna or directional sensor, respectively.

The GPS satellite can have a position relative to a horizon 242 (i.e., horizontal plane with the ground relative to the GPS receiver) for the host vehicle. The GPS satellite can be in an overhead position 244, when the GPS satellite is in a perpendicular position with the horizontal plane or 90 degrees with the horizon. An elevation angle can be an angle of the GPS satellite with the horizon relative to the GPS receiver, where the elevation angle can have a range from zero degrees (0°) to ninety degrees (90°). For example, an index GPS satellite 222 is shown with an elevation angle 240. The GPS receiver can have a greater multipath error when the GPS satellite has a smaller elevation angle, which can adversely affect GPS positioning precision and can generate greater number of cycle slips. A multipath error can occur when multiple duplicate phase shifted signals (due to reflection and other causes) are received by the GPS receiver.

When a GPS receiver is a static receiver (e.g., a receiver not in motion relative to the ground), a directional sensor on the host vehicle may not be needed, thus the change in position of the directional sensor and the angular velocity of the GPS receiver (e.g., $u_i^T (\Delta p_{IMU} + \omega \times 1)$ (shown in Equation 1)) can be approximately zero. Alternatively, when a GPS receiver with a directional sensor is static (e.g., the vehicle dynamics is static), the directional sensor information may not contribute to the change in position and the angular velocity of the GPS receiver due to the lack of motion by the host vehicle, thus the change in position and the angular velocity of the GPS receiver $u_i^T (\Delta p_{IMU} + \omega \times 1)$ (shown in Equation 1) may be approximately zero.

Figure 4:
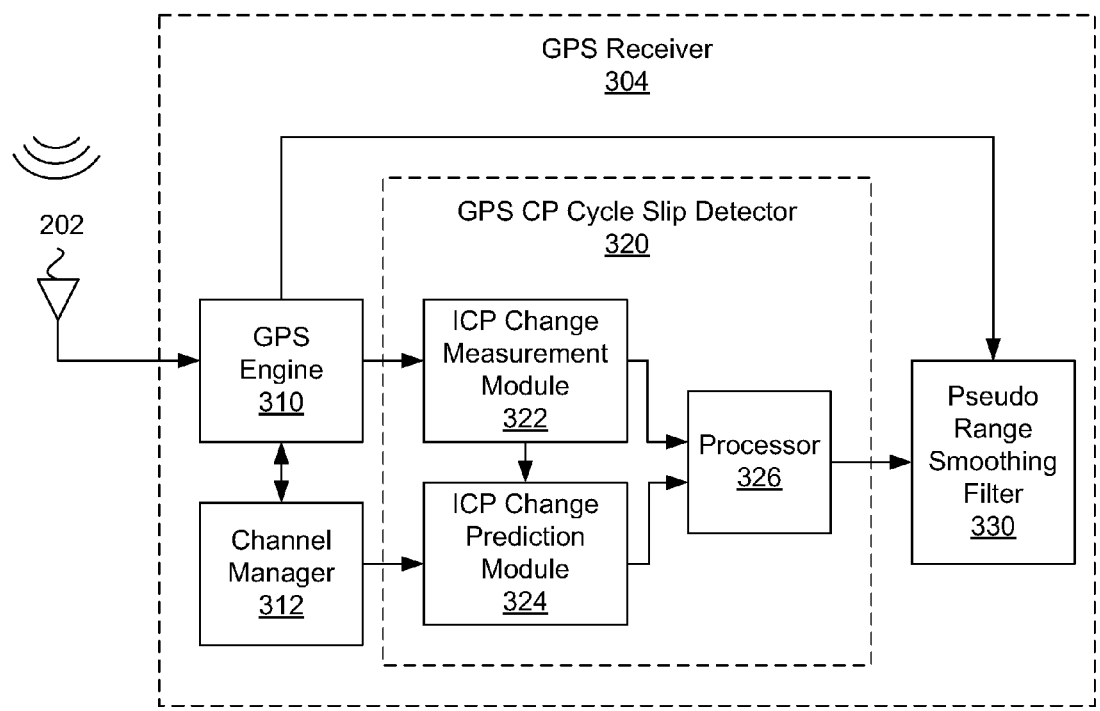
FIG. 4 illustrates a block diagram of a global positioning system (GPS) receiver with a GPS carrier phase (CP) cycle slip detector in accordance with an example of the present invention.

FIG. 4 illustrates an example of a GPS CP cycle slip detector 320 in a static GPS receiver 300 without a radio or a navigation module. A static GPS receiver can refer to a GPS receiver that has a slow rotation or slow velocity relative to the sampling frequency, where a change in position for the time duration is negligible (e.g., within the threshold value). The GPS receiver can include a radio to communicate with a remote GPS receiver for relative positioning determination between a host vehicle and a remote vehicle. The GPS receiver can include a navigation module for factoring in host vehicle dynamics.

In an example, space vehicle (SV) dynamics or GPS satellite dynamics represented by the term $\int(u_1^T v_1)dt$ can be further evaluated, as shown. The SV dynamics can be expanded for evaluation by Expression 1, where $(u_i \cdot v_i)$ is the dot product of the unit LOS vector $u_i$ from the GPS receiver to the GPS satellite (e.g., the GPS satellite of interest or index GPS satellite) and a velocity vector $v_i$ of the GPS satellite in a Earth-Center-Earth-Fixed (ECEF) coordinate system frame.

$$\int_{t_{k-1}}^{t_k} (u_i \cdot v_i) dt \qquad \text{[Expression 1]}$$

The integral can be performed over the ICP change $\Delta ICP = ICP_k + ICP_{k+1}$ for a specified time duration or time interval, such as one second (1 sec), where k represents a positive integer for time. If simple differences (e.g., a single difference) is used between the unit LOS vector $u_i$ from the index GPS satellite and a unit LOS vector $u_r$ from the reference GPS satellite, the single difference unit LOS vector $u_{ir}$ can be represented by $u_{ir} = u_i - u_r$. For sufficient accuracy, $u_{ir}$, and $u_i$ can be assumed to be constant over a short time interval $(t_{k-1}, t_k)$, so Expression 1 can be represented by Expression 2.

$$u_i \cdot \int_{t_{k-1}}^{t_k} v_i \, dt \quad \text{[Expression 2]}$$

The term $v_i$ can be computed from ephemeris data, and the integral evaluation can be approximated by Equation 2, where N is a positive integer representing the number of subintervals selected and $$\Delta t_l = \frac{t_k - t_{k-1}}{N}.$$

The term $v_i$ can be evaluated N times to compute the GPS satellite dynamics.

$$\int_{t_{k-1}}^{t_k} v_i \, dt = \sum_{l=1}^{N} v_{i_l} \Delta t_l \quad \text{[Equation 2]}$$

FIG. 5 illustrates an example of a GPS CP cycle slip detector 320 in a static GPS receiver 300 with a relative position estimator 340. The relative position estimator can generate a three dimensional (3D) relative position vector ($\underline{r}$) using the filtered PR from the smoothing filter 330, a host vehicle velocity from the navigation module 314, and a remote vehicle velocity (e.g., a remote GPS receiver velocity) from the radio 316.

Figure 6A:
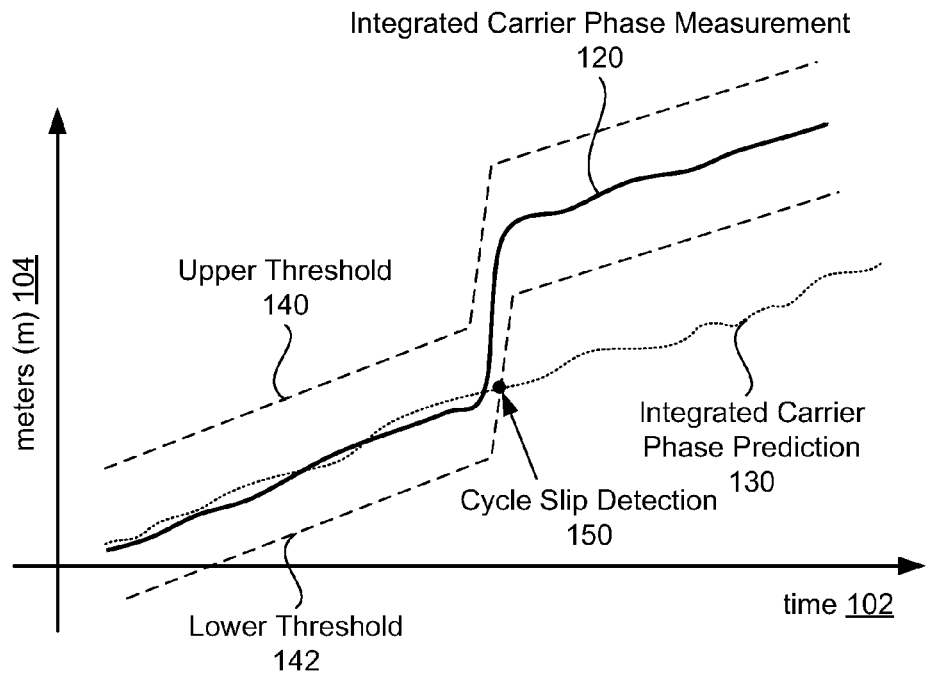
FIG. 6A illustrates a diagram of global positioning system (GPS) carrier phase (CP) cycle slip detection using a GPS integrated CP (ICP) measurement with threshold values and a GPS CP prediction in accordance with an example.

FIG. 6A illustrates a diagram of GPS CP cycle slip detection using a GPS ICP measurement 120 with upper and lower threshold values 140 and 142 and a GPS ICP prediction 130. A threshold value, including an upper threshold 140 and a lower threshold 142, can be set relative to the ICP measurement. The GPS ICP prediction can estimate an ICP measurement value using directional sensor information and GPS satellite ephemeris information for the short duration of time. Over a long duration of time (e.g., 20 seconds) the directional sensor information may drift from the ICP measurement causing the ICP prediction to become inaccurate for the precision tolerances of the GPS receiver (e.g., less than 20 cm). To correct for the directional sensor information drift, the CP prediction may be recalibrated to the CP measurement at regular intervals, such as every second.

Figure 6B:
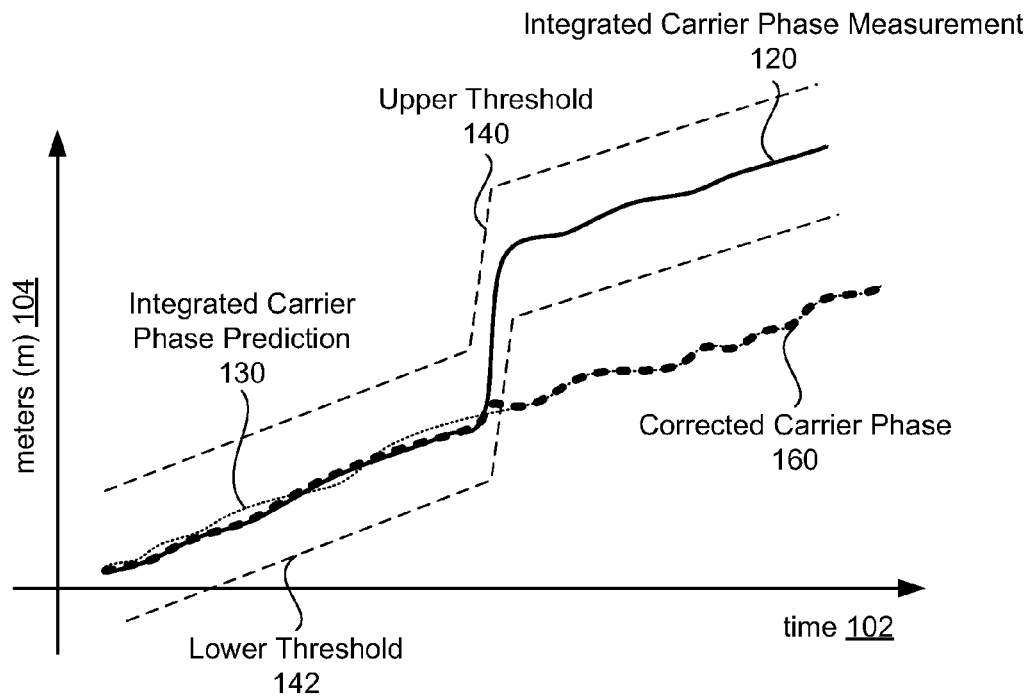
FIG. 6B illustrates a diagram of global positioning system (GPS) carrier phase (CP) cycle slip correction using a GPS integrated CP (ICP) measurement corrected with a GPS ICP prediction in accordance with an example.

When the measured ICP change 120 varies from the predicted ICP change 130 by greater than a threshold value 140, 142, a GPS CP cycle slip is detected 150. FIG. 6B illustrates a diagram of GPS CP cycle slip correction 160 using a GPS ICP measurement corrected with a GPS ICP prediction. When the measured ICP change varies from the predicted ICP change by greater than the threshold value, the measured ICP change for a CP cycle may be replaced with the predicted ICP change for the time duration. In another example, the predicted ICP change may replace the measured ICP change for multiple or consecutive cycle slips (e.g., a momentary loss of a GPS CP track) when the measured ICP change varies from the predicted ICP change by greater than the threshold value until the measured ICP is within the threshold value of the predicted ICP.

Figure 7A:
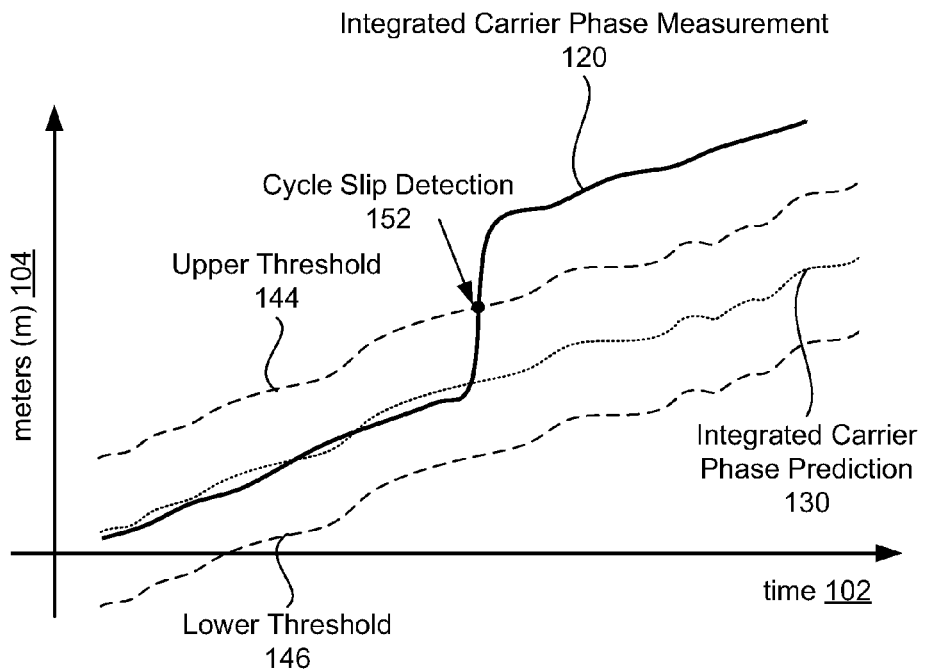
FIG. 7A illustrates a diagram of global positioning system (GPS) carrier phase (CP) cycle slip detection using a GPS integrated CP (ICP) measurement and a GPS ICP prediction with threshold values in accordance with an example.
Figure 7B:
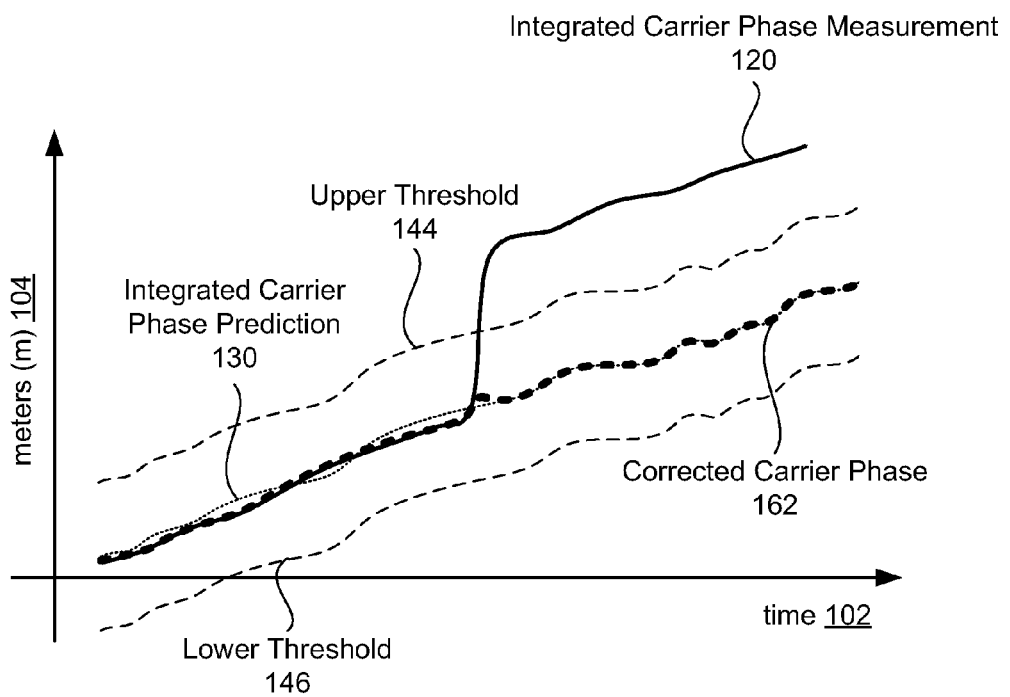
FIG. 7B illustrates a diagram of global positioning system (GPS) carrier phase (CP) cycle slip correction using a GPS integrated CP (ICP) measurement corrected with a GPS ICP prediction in accordance with an example.

FIG. 7A illustrates a diagram of GPS CP cycle slip detection where the upper threshold 144 and lower threshold 146 values are applied to the GPS ICP prediction. When the measured ICP change 120 varies from the predicted ICP change 130 by greater than a threshold value, a GPS CP cycle slip is detected 152. FIG. 7B illustrates a diagram of GPS CP cycle slip correction 162 using the GPS ICP measurement corrected with the GPS ICP prediction.

In another example, an ICP change can be generated (measured or predicted) separately on independent carrier frequencies (or with independent carrier components), such as a first carrier frequency and a second carrier frequency (e.g., $L_1$ or $L_2$), before a wide lane or a narrow lane combination. The ICP change can be compared between the first carrier frequency and second carrier frequency by applying a threshold value to the first carrier frequency. When the second carrier frequency varies by more that the threshold value, a cycle slip may be detected.

The predicted ICP change may be use to select the carrier frequency without the cycle slip for positioning measurements. In an example, the carrier frequency with the least variation from the predicted ICP change may be the carrier frequency selected for positioning measurements. In another example, the threshold can be applied to the predicted ICP change and when both the first carrier frequency and the second carrier frequency vary by more than a threshold value, a cycle slip can be detected on both carrier frequencies and the predicted ICP change can be used instead of the measured ICP change of the carrier frequencies. Using a corrected ICP change in each carrier smoothing filter can immunize integer search against cycle slips.

Figure 8:
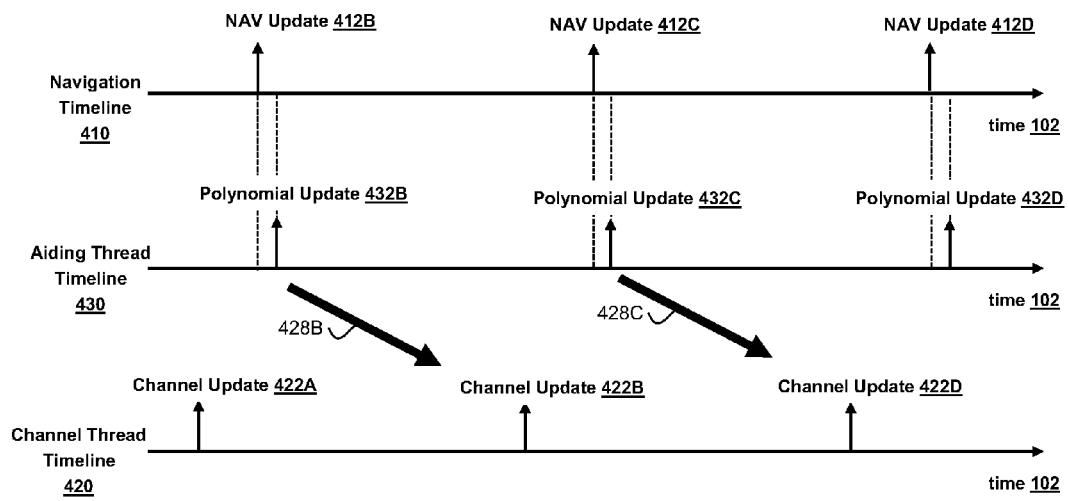
FIG. 8 illustrates a diagram of aligning navigation information with channel information in accordance with an example.

The GPS CP cycle slip detector may include a synchronization module for aligning navigation information from the navigation module with the measured ICP and a pseudo-range (PR) from the GPS engine or GPS satellite ephemeris information. Detecting GPS CP cycle slip may synchronize the measured ICP change with the predicted ICP change. FIG. 8 illustrates a diagram of synchronizing or aligning navigation information (e.g., directional sensor information) with channel information (e.g., GPS satellite ephemeris information) for a same time duration. The navigation module can run or sample directional sensor data with NAV updates 412B-D (on a navigation timeline 410) at a specified frequency (e.g., 50 Hz) independent of channel manager sampling or GPS engine carrier tracking. A LOS aiding thread in the navigation module can calculate polynomial coefficients for each channel as polynomial updates 432B-D (on an aiding thread timeline 430) to curve fit to the navigational velocity within a specified time after the NAV updates or the specified frequency phase shifted from the NAV updates. A separate channel thread in the channel manager can run or sample at channel time (correlated to N in Equation 2)) using the polynomial coefficients calculated by the LOS aiding thread to move 428B-C the LOS velocity aiding to the channel update time 422A-C (on a channel thread timeline 420).

Figure 9:
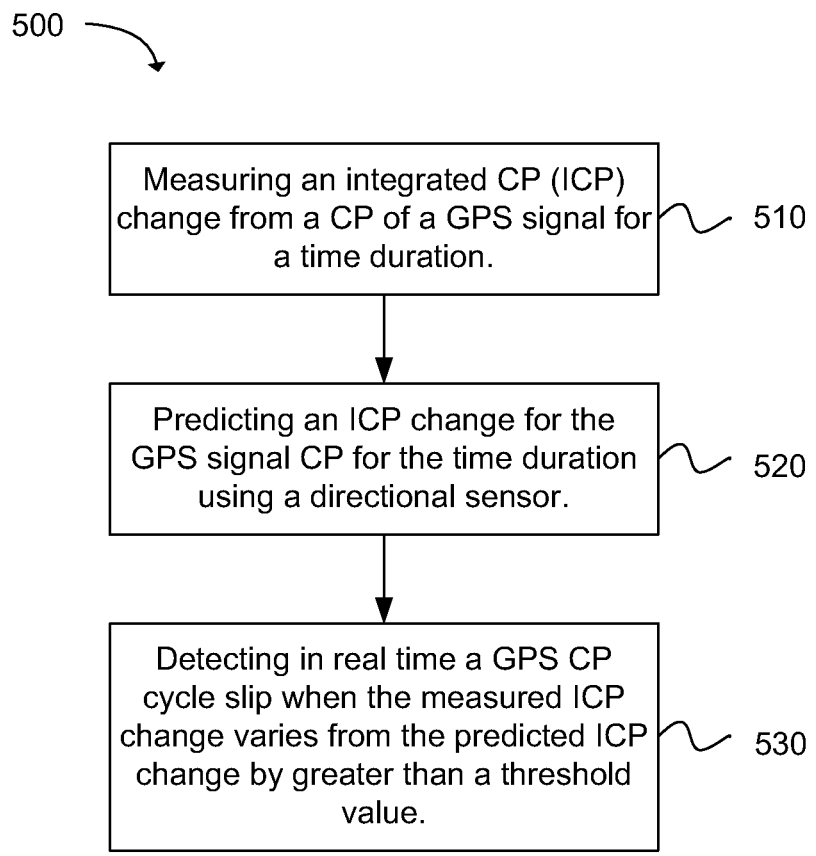
FIG. 9 depicts a flow chart of a method for detecting a global positioning system (GPS) carrier phase (CP) cycle slip in accordance with an example of the present invention.

Another example provides a method 500 for detecting a global positioning system (GPS) carrier phase (CP) cycle slip, as shown in the flow chart in FIG. 9. The method includes the operation of measuring an integrated CP (ICP) change from a GPS signal CP for a time duration, as in block 510. The operation of predicting an ICP change for the GPS signal CP for the time duration using directional position information follows, as in block 520. The next operation of the method can be detecting in real time a GPS CP cycle slip when the measured ICP change varies from the predicted ICP change by greater than a threshold value, as in block 530.

In another example, a computer program product including a computer readable program code embodied on a computer usable medium may be adapted to execute the method for detecting the GPS CP cycle slip and/or correcting the GPS CP cycle slip. The computer usable medium can be a non-transitory medium. In another aspect, the GPS CP cycle slip detection and/or correction can be performed by a processor.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A global positioning system (GPS) carrier phase (CP) cycle slip detector, comprising:
    an integrated CP (ICP) change measurement module configured for generating a measured ICP change of a measured CP of a GPS signal for a time duration;
    an ICP change prediction module configured for determining a predicted ICP change of the GPS signal CP for the time duration using dead reckoning position information, wherein the predicted ICP change is determined based on a change in position projected along a GPS satellite line-of-sight (LOS) over the time duration, a clock phase error change over the time duration, and an integration of a velocity of a GPS satellite projected along the GPS satellite LOS over the time duration; and
    a processor configured for detecting in near real time a GPS CP cycle slip when the measured ICP change varies from the predicted ICP change by greater than a threshold value, whereupon the processor corrects in real time the GPS CP cycle slip by replacing the measured ICP change for a CP cycle with the predicted ICP change.

2. The GPS CP cycle slip detector of claim 1, wherein the ICP change prediction module is further configured for:
    determining that the change in position projected along the GPS satellite line-of-sight (LOS) is from a phase center of a GPS antenna over the time duration;
    accounting for the clock phase error change over the time duration;

integrating the velocity of the GPS satellite that is projected along the GPS satellite LOS over the time duration; and summing the change in position, the clock phase error change, and the integration of the velocity of the GPS satellite to generate the predicted ICP change.

3. The GPS CP cycle slip detector of claim 1, wherein the CP is selected from the group consisting of an $L_1$ CP, an $L_2$ CP, a wide-lane CP, and combinations thereof.

4. A GPS receiver for estimating a position vector of a host vehicle using global positioning system (GPS) carrier phase (CP) information, comprising:

a GPS antenna configured for receiving a GPS signal from a GPS satellite;

a GPS engine configured for generating a measured ICP and a pseudo-range (PR) from the GPS signal;

a channel manager configured for generating satellite ephemeris information;

a navigation module configured for generating a change in position of the host vehicle using dead reckoning position information from a dead reckoning sensor;

a GPS CP cycle slip detector configured for detecting in near real time a GPS CP cycle slip when a measured ICP change of a measured CP of a GPS signal for a time duration varies from a predicted ICP change of the GPS signal CP for the time duration by greater than a threshold value, wherein the predicted ICP change is determined based on: a change in position projected along a GPS satellite line-of-sight (LOS) over the time duration, a clock phase error change over the time duration, and an integration of a velocity of the GPS satellite projected along the GPS satellite LOS over the time duration, whereupon the GPS CP cycle slip is corrected in real time by replacing the measured ICP change for a CP cycle with the predicted ICP change, wherein the predicted ICP change uses the change in position and satellite ephemeris information; and a PR smoothing filter configured for generating a filtered PR from an output of the GPS CP cycle slip detector.

5. The GPS receiver of claim 4, wherein the GPS CP cycle slip detector further comprises:

a synchronization module configured for aligning navigation information from the navigation module with the measured ICP; and a pseudo-range (PR) from the GPS engine.

6. The GPS receiver of claim 4, wherein the dead reckoning sensor is selected from the group consisting of an inertial measurement unit (IMU), an inertial navigation system (INS), a motion sensor, an accelerometer, a rotation sensor, a gyroscope, wheel counters, odometers, and combinations thereof.

7. The GPS receiver of claim 4, further comprising:

a radio configured for receiving a filtered ICP and a filtered PR from a second GPS receiver, wherein the GPS receiver differences the filtered ICP and the filtered PR from second GPS receiver with a filtered ICP and a filtered PR from the GPS receiver.

8. A method for detecting a global positioning system (GPS) carrier phase (CP) cycle slip, comprising:

measuring an integrated CP (ICP) change from a GPS signal CP for a time duration;

predicting an ICP change for the GPS signal CP for the time duration using dead reckoning position information, wherein the predicted ICP change is determined based on: a change in position projected along a GPS satellite line-of-sight (LOS) over the time duration, a clock phase error change over the time duration, and an integration of a velocity of a GPS satellite projected along the GPS satellite LOS over the time duration;

detecting in real time a GPS CP cycle slip when the measured ICP change varies from the predicted ICP change by greater than a threshold value; and correcting in near real time the GPS CP cycle slip by replacing the measured ICP for a CP cycle with the predicted ICP when the measured ICP change varies from the predicted ICP change by greater than the threshold value.

9. The method of claim 8, wherein predicting the ICP change further comprises:

determining the change in position projected along the GPS satellite line-of-sight (LOS) from a phase center of a GPS antenna of a GPS receiver over the time duration using the dead reckoning position information from a dead reckoning sensor;

accounting for the clock phase error change over the time duration;

integrating the velocity of the GPS satellite projected along the GPS satellite LOS over the time duration; and summing the change in position, the clock phase error change, and the integration of the velocity of the GPS satellite to generate the predicted ICP change.

10. The method of claim 8, wherein detecting the GPS CP cycle slip further comprises synchronizing the measured ICP change and the predicted ICP change.

11. The method of claim 8, wherein the threshold value is approximately a half of wavelength of the CP.

12. The method of claim 8, wherein the time duration is less than one second.

13. The method of claim 8, wherein the time duration is less than five seconds.

14. The method of claim 9, wherein the dead reckoning sensor is selected from the group consisting of an inertial measurement unit (IMU), an inertial navigation system (INS), a motion sensor, an accelerometer, a rotation sensor, a gyroscope, wheel counters, odometers, and combinations thereof.

15. The method of claim 8, further comprising correcting in near real time a momentary loss of a GPS CP track by replacing the measured ICP with the predicted ICP when the measured ICP change varies from the predicted ICP change by greater than the threshold value until the measured ICP is within the threshold value of the predicted ICP.

16. The method of claim 9, wherein the predicted ICP change using the dead reckoning sensor information is represented by $\Delta ICP_i = u_i^T(\Delta p_{IMU} + \omega \times 1) + \Delta\delta\phi + \int(u_i^T v_i)dt$, where $\Delta ICP_i$ is the predicted integrated ICP change for a GPS satellite with index i, $u_{i,}^T$ is a transpose of a unit line-of-sight (LOS) vector from a GPS receiver to the GPS satellite, $\Delta p_{IMU}$ is a change in a position vector of an inertial measurement unit (IMU), $\omega$ is an angular velocity vector of the GPS receiver, l is a lever arm vector between the IMU and a phase center for a GPS antenna for the GPS receiver, $\Delta\delta\phi$ is a clock phase error change over the time duration, and $v_i$ is a velocity of the GPS satellite.

17. A computer program product, comprising a non-transitory computer usable medium having a computer readable program code embodied therein, the computer readable program code adapted to be executed to implement the method of claim 8.

* * * * *

UNITED STATES PATENT AND TRADEMARK OFFICE
CERTIFICATE OF CORRECTION

PATENT NO. : 9,182,497 B2  
APPLICATION NO. : 13/415751  
DATED : November 10, 2015  
INVENTOR(S) : Geier et al.

Page 1 of 1

It is certified that error appears in the above-identified patent and that said Letters Patent is hereby corrected as shown below:

On the title page item [75],

David Michael delete "Sneffner", and insert -- Senffner --.

Signed and Sealed this  
Eighth Day of March, 2016

Michelle K. Lee  
*Director of the United States Patent and Trademark Office*